Oct. 29, 1940.  H. HORN  2,219,283
APPARATUS FOR CONVEYING POWDERED MATERIAL
Filed Aug. 22, 1938
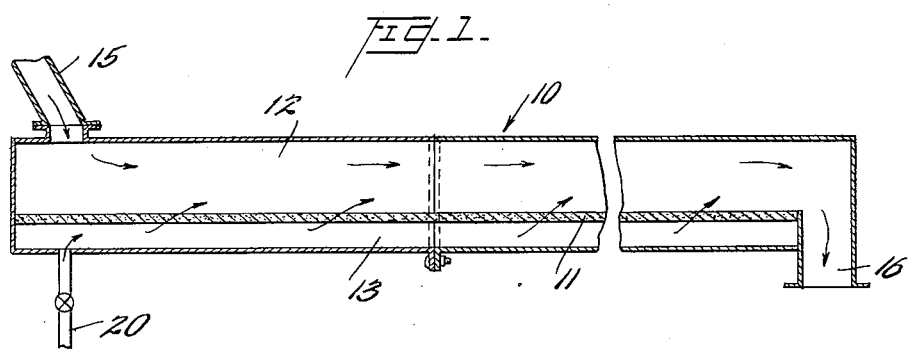
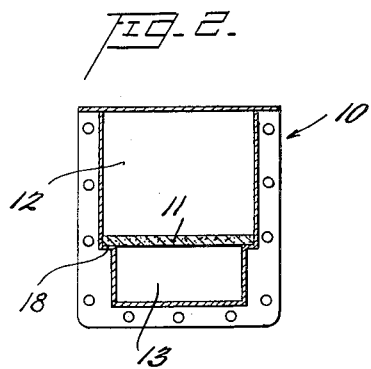
Inventor
Hans Horn,
By Watson, Cole, Grindle & Watson
Attorneys Patented Oct. 29, 1940

2,219,283

UNITED STATES PATENT OFFICE 2,219,283

APPARATUS FOR CONVEYING POWDERED MATERIAL

Hans Horn, Dessau, Germany, assignor to firm G. Polysius Aktiengesellschaft, Dessau, Germany Application August 22, 1938, Serial No. 226,202
In Germany March 8, 1938

1 Claim. (Cl. 302—29)

This invention relates to apparatus for the conveying of material in pulverulent or finely divided form, for instance cement, coal dust, or farinaceous material. It is the principal object of the invention to provide a simple, effective, and inexpensive means whereby the material can be rapidly conveyed and whereby resistance to flow of the material may be reduced to a minimum.

It has heretofore been proposed to thoroughly mix and agitate pulverulent material during the process of conveying the same. Thus in the patent to Ihlefeldt 1,971,853, granted August 28, 1934, it is proposed to provide a conveying trough or conduit which consists at least in part of a support for the material, the support being formed of a porous or gas pervious substance, a gaseous medium under pressure being forced through this support to maintain the material being conveyed in a suspended state approximating a fluid condition. With this construction it is possible to form in this manner a blanket of air adjacent the upper surface of the support, and the finely divided material is carried along on this air blanket so that little or no resistance is offered to movement.

Excellent results have been achieved with this construction, but the apparatus for supplying the air under pressure and conducting the same through the support has constituted an expensive item of the equipment. Thus in the equipment heretofore manufactured, it has been the practice to provide a plurality of separate chambers beneath the conveying trough for supplying air to the lower side of the support at the desired pressures. An air pipe, extending longitudinally of the entire length of the conveying trough, was connected with the several chambers by separate branch pipes, and it was ordinarily necessary to provide fittings between successive lengths of the main supply pipe to effect gradual reduction in the diameter of the latter so as to ensure the proper conditions of flow and pressure in the pipe and in the several chambers underneath the trough.

It is a feature of the instant invention that the expense of manufacturing and maintaining in operation apparatus of the character described is materially reduced by the elimination of the supply pipe and the numerous branches heretofore deemed necessary. In the preferred form of the invention, the desired result is achieved by conducting the air under pressure through a single uninterrupted conduit of cross sectional area sufficient to avoid substantial drop in the air pressure at points widely spaced in the direction of the trough length.

More specifically, it is an object of the invention to provide in a unitary structure a conveying trough and an air pressure supply conduit, the conduit and the trough being separated only by the porous bottom of the trough. It is proposed as part of the invention to form the air supply conduit of such uniform or variable cross sectional area as may be required to establish different pressures at different points spaced longitudinally of the conduit.

Further objects and features of the invention will be apparent from the following description taken in connection with the accompanying drawing in which:

Figure 1 is a longitudinal vertical sectional view of apparatus embodying the principles of the invention; and Figure 2 is a transverse sectional view of the structure shown in Figure 1.

For convenience in describing the invention and to facilitate an understanding thereof reference is made to the embodiment thereof shown in the accompanying drawing and specific language is employed to describe the several elements of the structure. It will nevertheless be understood that no limitation of the invention is thereby intended, such further modifications and alterations being contemplated as would ordinarily occur to one skilled in the art to which the invention relates.

In the preferred form of the invention illustrated in the drawing, the apparatus comprises an elongated housing 10 which is arranged to extend between a supply point and a delivery point for the material to be conveyed. The housing 10 is separated by a generally horizontal partition 11 into an upper conduit 12 and a lower conduit 13. At one end of the upper conduit 12 a material inlet port is provided, a supply pipe 15 for the material to be conveyed communicating with this port. At its opposite end the conduit 12 is in communication with a discharge pipe 16 for delivery of the material. The partition 11 may be supported in the housing 10 in any convenient manner. For example, as shown in Figure 2, the housing may be a unitary structure formed to provide shoulders 18 extending longitudinally and generally horizontally thereof on which the partition 11 rests. The partition is so constructed as to be permeable by a gaseous medium; preferably it is formed of gas pervious or porous material such as filter stones, porous brick, porous rubber, porous porcelain, or similar substances, the nature of the material being such that the gas may flow upwardly through the partition and may emerge therefrom in a finely divided state, the development of individual jets or streams of gas being preferably avoided.

Communicating with the lower conduit 13, preferably at that end of the conduit adjacent the material inlet 15, is a pipe 20 communicating with a source of supply of gaseous medium under pressure. The conduit 13 is preferably otherwise closed, and the gaseous medium is thus forced upwardly through the partition 11 as hereinbefore described. It will be appreciated that this partition constitutes a support for the material which is introduced through the pipe 15, and as the material is introduced into the conduit 12, it is suffused by the gaseous medium as the latter passes upwardly through the port 13, and the material is thereby caused to approximate the condition of a fluid emulsion, so that it may flow freely through the conduit 12 toward the discharge end thereof. Obviously the nature of the support 11 is such that a blanket of the gaseous medium is established on the upper surface thereof which effectively prevents clogging of the material and reduces to a minimum the resistance to flow of the material.

As hereinbefore pointed out, it is a feature of the instant invention that the conduit 13 is substantially uninterrupted throughout the length of the housing 10 and is positioned directly beneath and in open communication with the underside of the support or partition 11, so that the use of expensive piping connections and the subdivision of the space beneath the support are avoided.

The invention contemplates the formation of the conduit 13 so as to ensure the desired distribution of the gaseous medium through the support 11 and into the conduit 12. Thus by tapering the conduit 13, the pressure of the gaseous medium at any point in the length of the conduit may be predetermined and the desired rate of diffusion thereof into the upper conduit 12 at different points may be accurately established. For example, it is sometimes desirable that a greater volume of the gaseous medium be introduced into the upper conduit 12 adjacent the material inlet end thereof than adjacent the discharge end thereof, the volume gradually decreasing toward the discharge end, so as to establish a tendency of flow of the material toward the discharge end. This may be accomplished by progressively decreasing the size of the supply conduit 13 from that end adjacent the material inlet 15 toward the opposite end. The transverse sectional contour of conduits 12 and 13 need not be rectangular, but may be of other desired contour.

It will also be understood that it is not essential that the partition or support 11 be precisely horizontal. In fact it is frequently desirable to incline this partition downwardly toward the discharge end of the housing 10, so as to facilitate flow of the material within the housing.

Having thus described the invention, what is claimed as new and desired to be secured by Letters Patent is:

An apparatus for conveying finely divided material comprising a generally horizontally disposed casing, a generally horizontal partition wall of porous substance dividing the casing into upper and lower compartments, the upper compartment having at one end an inlet for the material to be conveyed and a discharge outlet at the other end, the lower compartment being relatively shallow and unobstructed, and means for introducing a gaseous medium under pressure into said lower compartment at the inlet end of the casing, whereby the gaseous medium may flow through the porous partition to agitate and convey the material thereon, said lower compartment being so dimensioned that the pressure of gaseous medium flowing through said partition wall is gradually decreased from the material inlet toward the material outlet.

HANS HORN.